(12) United States Patent
Sato et al.

(10) Patent No.: US 11,757,348 B2
(45) Date of Patent: Sep. 12, 2023

(54) CONTROL DEVICE FOR POWER CONVERSION DEVICE

(71) Applicant: HONDA MOTOR CO., LTD., Tokyo (JP)

(72) Inventors: Hiroaki Sato, Tokyo (JP); Ryota Kitamoto, Saitama (JP); Yusuke Shindo, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/680,883

(22) Filed: Feb. 25, 2022

(65) Prior Publication Data

US 2022/0311324 A1    Sep. 29, 2022

(30) Foreign Application Priority Data

Mar. 25, 2021 (JP) ................. 2021-052250

(51) Int. Cl.
*H02M 1/14* (2006.01)
*H02M 3/158* (2006.01)
(Continued)

(52) U.S. Cl.
CPC ........... *H02M 1/15* (2013.01); *H02M 1/0043* (2021.05); *H02M 1/0064* (2021.05); *H02M 1/14* (2013.01);
(Continued)

(58) Field of Classification Search
CPC .......... H02M 1/14; H02M 1/15; H02M 3/003; H02M 3/156; H02M 3/158; H02M 1/0064
See application file for complete search history.

(56) References Cited

U.S. PATENT DOCUMENTS

2015/0170822 A1*  6/2015  Ye .................. H01F 38/023
                                                      336/12
2019/0366850 A1   12/2019  Ge et al.
(Continued)

FOREIGN PATENT DOCUMENTS

JP       2002-208519 A    7/2002
WO    WO 2018/116437 A1   6/2018

OTHER PUBLICATIONS

Nov. 15, 2022, Japanese Office Action issued for related JP Application No. 2021-052250.
(Continued)

*Primary Examiner* — Gary L Laxton
(74) *Attorney, Agent, or Firm* — Paratus Law Group, PLLC

(57) ABSTRACT

A control device, for a power conversion device using a three-phase magnetic coupling reactor, includes: a first outer coil; a second outer coil; an inner coil disposed between the first outer coil and the second outer coil; and a core including a first outer core portion around which the first outer coil is wound, a second outer core portion around which the second outer coil is wound, and an inner core portion around which the inner coil is wound. Directions of magnetic fluxes generated in the first outer coil, the second outer coil, and the inner coil are opposite to each other in any combination. In a three-phase operation, the control device controls a value of the current flowing through the inner coil so as to approach values of the currents flowing through the first outer coil and the second outer coil.

1 Claim, 6 Drawing Sheets

(51) Int. Cl.
    *H02M 1/15* (2006.01)
    *H02M 3/00* (2006.01)
    *H02M 1/00* (2006.01)
(52) U.S. Cl.
    CPC ......... *H02M 3/003* (2021.05); *H02M 3/1584* (2013.01); *H02M 3/1586* (2021.05)

(56) References Cited

U.S. PATENT DOCUMENTS

| | | | |
|---|---|---|---|
| 2020/0052576 A1 | 2/2020 | Murakami et al. | |
| 2022/0093325 A1* | 3/2022 | Shi | H02M 3/01 |
| 2022/0270807 A1* | 8/2022 | Yao | H02M 3/003 |

OTHER PUBLICATIONS

Noah et al., A Current Sharing Method Utilizing Single Balancing Transformer for a Multiphase LLC Resonant Converter With Integrated Magnetics, IEEE Journal of Emerging and Selected Topics in Power Electronics, Jun. 2018, pp. 977-992, vol. 6, No. 2.

* cited by examiner

CONTROL DEVICE FOR POWER CONVERSION DEVICE

CROSS-REFERENCE TO RELATED APPLICATIONS

The present application claims the benefit of priority of Japanese Patent Application No. 2021-052250, filed on Mar. 25, 2021, the content of which is incorporated herein by reference.

TECHNICAL FIELD

The present invention relates to a control device for a power conversion device.

BACKGROUND ART

In a DC-DC converter of a vehicle such as an electric vehicle or a hybrid electrical vehicle (HEV), a reactor configured by mounting a coil around a core is used. In recent years, a proposal is made to use a three-phase magnetic coupling reactor as the reactor to adjust a ripple of an output current of the DC-DC converter. In addition, it is preferable to improve cooling efficiency of the three-phase magnetic coupling reactor while reducing a size of the three-phase magnetic coupling reactor.

Therefore, Non Patent Literature 1 discloses that, as compared with a case where three single reactors are used, a core having a three-dimensional structure in which a center core portion (center leg) is taken as a center, outer core portions (outer legs) are disposed every 120° on a circumference of the center core portion, and the center core portion and the outer core portions are connected at one end side and the other end side in a longitudinal direction has a smaller volume. In addition, Non Patent Literature 1 also discloses a core having a planar structure in which an inner core portion and a pair of outer core portions disposed on two sides of the inner core portion are connected at one end side and the other end side in the longitudinal direction. A size of the core having the planar structure can be reduced similarly to the core having the three-dimensional structure, and the core having the planar structure has better cooling performance than the core having the three-dimensional structure. However, in the core having the planar structure, a magnetic flux generated in an inner coil and a magnetic flux generated in an outer coil during a three-phase drive are not uniform, direct current magnetic fluxes are not sufficiently canceled, and a volume of the core tend to increase in order to prevent the magnetic fluxes from being saturated.

On the other hand, Patent Literature 1 discloses that, in a three-phase magnetic coupling reactor, a concave groove is provided in an abutting surface of a middle leg to increase magnetic resistance in the middle leg.

Related Art Literature

Patent Literature

Patent Literature 1: JP-A-2002-208519

Non Patent Literature

Non Patent Literature 1: A Current Sharing Method Utilizing Single Balancing Transformer for a Multiphase LLC Resonant Converter With Integrated Magnetics {IEEE Journal of Emerging and Selected Topics in Power Electronics (Volume: 6, Issue: 2, June 2018)}

SUMMARY OF THE INVENTION

Problem that the Invention is to Solve

As for the core having the planar structure, a method of reducing the direct current magnetic flux by adopting a structure as disclosed in Patent Literature 1 is known, but there is room for consideration of other methods.

The present invention provides a control device for a power conversion device capable of reducing a direct current magnetic flux by electrical control during a three-phase operation in a three-phase magnetic coupling reactor using a core having a planar structure.

Means for Solving the Problem

According to an aspect of the present invention, there is provided a control device for a power conversion device using a three-phase magnetic coupling reactor, the control device including: a first outer coil; a second outer coil; an inner coil disposed between the first outer coil and the second outer coil; and a core including a first outer core portion around which the first outer coil is wound, a second outer core portion around which the second outer coil is wound, and an inner core portion around which the inner coil is wound, where; the first outer core portion, the second outer core portion, and the inner core portion extend in a first direction and are disposed side by side in a second direction orthogonal to the first direction; the first outer core portion, the second outer core portion, and the inner core portion are connected by a first connecting portion that extends in a second direction on one end side in the first direction; the first outer core portion, the second outer core portion, and the inner core portion are connected by a second connecting portion that extends in the second direction on the other end side in the first direction, directions of magnetic fluxes generated in the first outer coil, the second outer coil, and the inner coil are opposite to each other in any combination; and in a three-phase operation in which currents are caused to flow through all of the first outer coil, the second outer coil, and the inner coil to be operated, the control device controls a value of the current flowing through the inner coil so as to approach values of the currents flowing through the first outer coil and the second outer coil.

Advantages of the Invention

According to the present invention, during the three-phase operation in the power conversion device using the three-phase magnetic coupling reactor having a planar structure, a direct current magnetic flux can be reduced by electrical control.

MODE FOR CARRYING OUT THE INVENTION

Hereinafter, a control device for a power conversion device according to an embodiment of the present invention will be described with reference to drawings.

Figure 1:
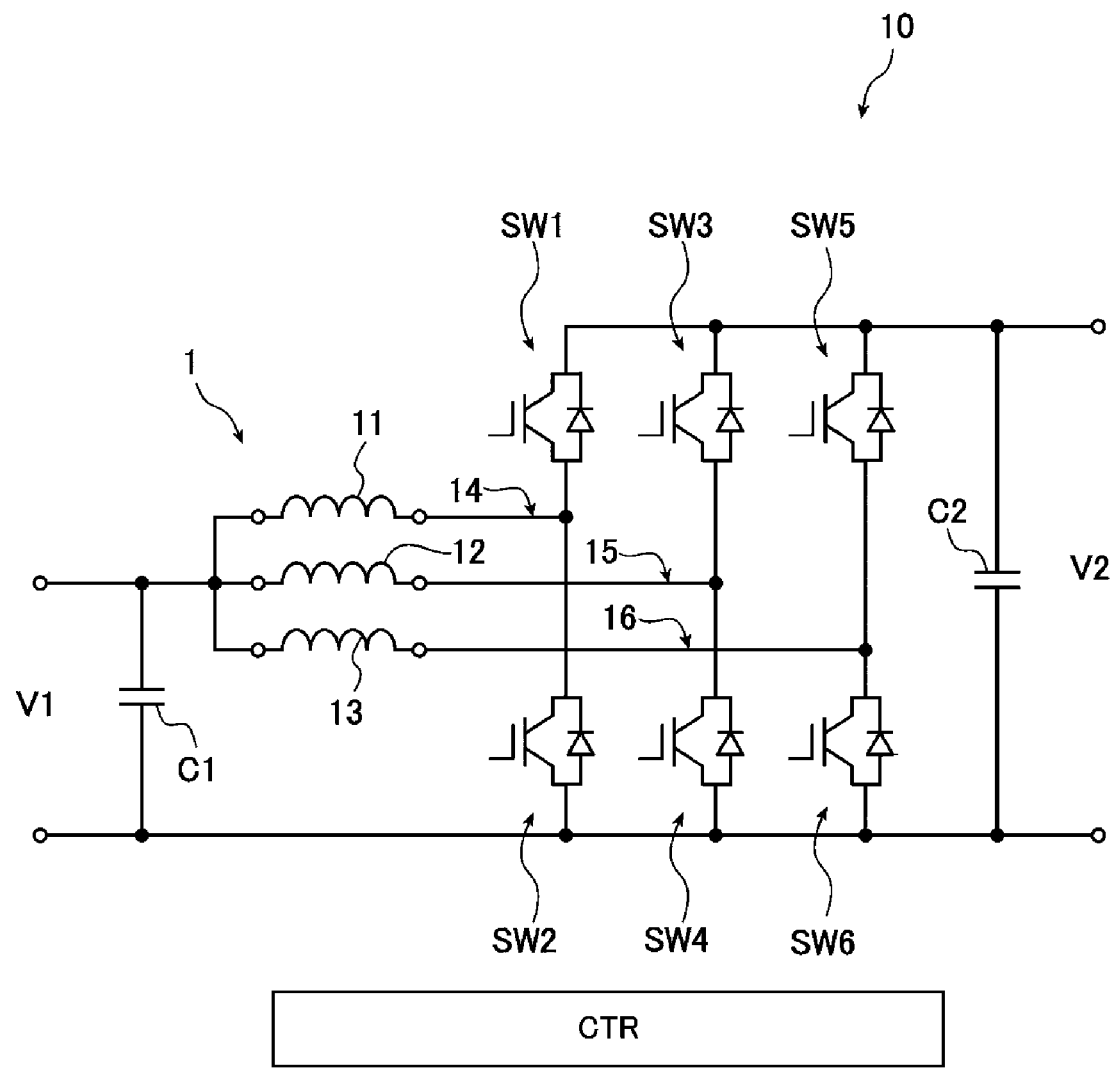
FIG. 1 is a circuit diagram of a three-phase interleaved DC-DC converter 10.

First, a three-phase interleaved DC-DC converter as an example of a power conversion device to be controlled by the control device of the present invention will be described. FIG. 1 is a circuit diagram showing the three-phase interleaved DC-DC converter.

A three-phase interleaved DC-DC converter 10 (hereinafter referred to as "DC-DC converter 10") shown in FIG. 1 includes a smoothing capacitor C1, a three-phase magnetic coupling reactor 1 (hereinafter referred to as "three-phase reactor") having three coils 11 to 13, switch portions SW1, SW2, SW3, SW4, SW5, and SW6, a smoothing capacitor C2, and a control device CTR.

When the DC-DC converter operates using a voltage V1 on a smoothing capacitor C1 side as an input voltage and a voltage V2 on a smoothing capacitor C2 side as an output voltage, the DC-DC converter boosts the input voltage V1.

In the three-phase reactor 1, input terminals of the coils 11 to 13 are connected in parallel to a power supply line on a high potential side. An output terminal of the coil 11 of the three-phase reactor 1 is connected to an intermediate node between the switch portion SW1 and the switch portion SW2 connected in series, and forms a first voltage conversion unit 14. An output terminal of the coil 12 of the three-phase reactor 1 is connected to an intermediate node between the switch portion SW3 and the switch portion SW4 connected in series, and forms a second voltage conversion unit 15. An output terminal of the coil 13 of the three-phase reactor 1 is connected to an intermediate node between the switch portion SW5 and the switch portion SW6 connected in series, and forms a third voltage conversion unit 16. Each of the switch portions SW1, SW2, SW3, SW4, SW5, and SW6 has a switching element such as an insulated-gate bipolar transistor (IGBT) and a reflux diode connected in parallel to the switching element. A term "three-phase" of the three-phase reactor 1 means that the number of conversion units is three. A one-phase operation to be described later means that the number of conversion units that operate among the first voltage conversion unit 14 to the third voltage conversion unit 16 is one, a two-phase operation means that the number of conversion units that operate among the first voltage conversion unit 14 to the third voltage conversion unit 16 is two, and a three-phase operation means that the number of conversion units that operate among the first voltage conversion unit 14 to the third voltage conversion unit 16 is three.

The switching elements of the switch portions SW1 to SW6 are controlled to be turned on and off by signals from the control device CTR. The three voltage conversion units 14, 15, and 16 included in the DC-DC converter 10 are electrically connected in parallel, and the switching element of at least one of the voltage conversion units 14, 15, and 16 is subjected to an ON/OFF switching operation at a desired timing, so that the voltage V1 is boosted with a direct current as it is, and the voltage V2 is output. The ON/OFF switching operation of the switch portions SW1, SW2, SW3, SW4, SW5, and SW6 of the voltage conversion units 14, 15, and 16 is controlled by a switching signal having a predetermined duty ratio in a pulse form from a switching control unit to the DC-DC converter 10.

When the switching elements of the voltage conversion units 14, 15, and 16 are subjected to ON/OFF switching control, an input current to the DC-DC converter 10 flows to a switching element side during an ON operation, the three-phase reactor 1 stores energy, and the input current to the DC-DC converter 10 flows to a diode side during an OFF operation, and the three-phase reactor 1 releases the stored energy. In a case of the one-phase operation in which only one of the three voltage conversion units 14, 15, and 16 of the DC-DC converter 10 is driven, a current flowing through the one voltage conversion unit of the DC-DC converter 10 during the OFF operation is output. In addition, when the two-phase operation in which two of the three voltage conversion units 14, 15, and 16 of the DC-DC converter 10 are driven, interleave control is performed to shift ON/OFF switching phases of the voltage conversion units 14, 15, and 16 to be driven by 180°. When the three-phase operation in which all of the three voltage conversion units 14, 15, and 16 of the DC-DC converter 10 are driven, the interleave control is performed to shift the ON/OFF switching phases of each of the voltage conversion units 14, 15, and 16 by 120°.

By increasing the number of the voltage conversion units 14, 15, and 16 to be driven, a ripple of an output current can be reduced. In addition, although switching loss increases due to an increase in the number of the voltage conversion units 14, 15, and 16 to be driven, conduction loss decreases. The control device CTR selects the number of voltage conversion units 14, 15, and 16 to be driven using a map or the like indicating energy efficiency of the DC-DC converter 10 in consideration of loss for each number of the voltage conversion units 14, 15, and 16 to be driven.

Next, a structure of the three-phase reactor 1 will be described. In a following description, among the three coils 11 to 13, the coils 11 and 13 disposed on an outer side are referred to as a first outer coil 11 and a second outer coil 13, respectively, and the coil 12 sandwiched between the first outer coil 11 and the second outer coil 13 is referred to as an inner coil 12. In addition, as shown in FIGS. 2 and 3, a positional relationship of each part will be described using an orthogonal coordinate system of an X axis, a Y axis, and a Z axis of the three-phase reactor 1.

Figure 2:
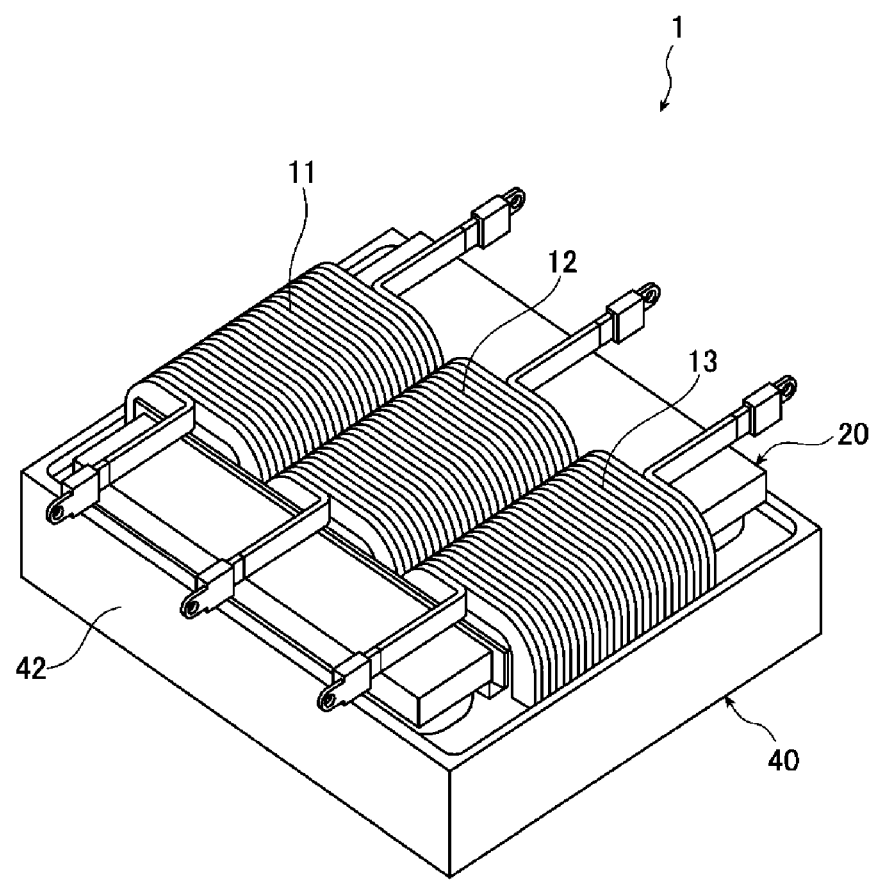
FIG. 2 is a perspective view of a three-phase magnetic coupling reactor 1 used in the DC-DC converter 10.
Figure 3:
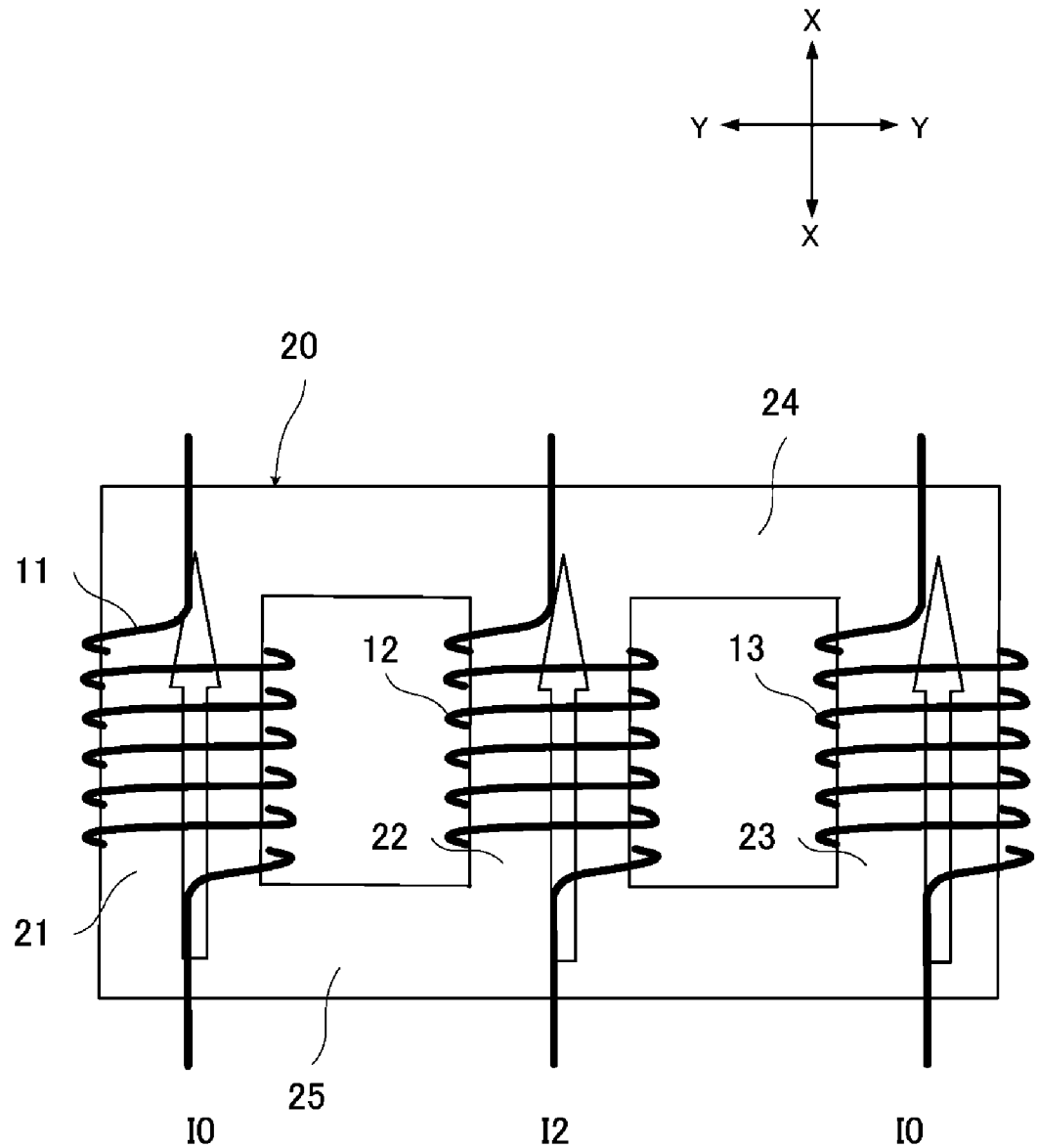
FIG. 3 is a plan view of the three-phase magnetic coupling reactor 1 showing a magnetic flux generated inside a core 20.

As shown in FIG. 2, the three-phase reactor 1 includes the first outer coil 11, the second outer coil 13, the inner coil 12, a core 20, and a housing 40 that accommodates the first outer coil 11, the second outer coil 13, the inner coil 12, and the core 20.

The core 20 may be formed by, for example, pressure-molding soft magnetic powder, or may be formed by stacking thin plate-shaped electromagnetic steel sheets. As shown in FIG. 3, the core 20 includes a first outer core portion 21, an inner core portion 22, and a second outer core portion 23 that extend in an X-axis direction and disposed side by side in parallel with each other along a Y-axis direction, a first connecting portion 24 that extends in the Y-axis direction on one end side in the X-axis direction and connects the first outer core portion 21, the inner core portion 22, and the second outer core portion 23, and a second connecting portion 25 that extends in the Y-axis direction on the other end side in the X-axis direction and connects the first outer core portion 21, the inner core portion 22, and the second outer core portion 23. In other words, the core 20 is a core having a planar structure disposed on an XY plane formed along the X-axis direction and the Y-axis direction. The X-axis direction is a first direction of the present invention, and the Y-axis direction is a second direction of the present invention.

The first outer coil 11 is wound around the first outer core portion 21, the second outer coil 13 is wound around the second outer core portion 23, and the inner coil 12 is wound around the inner core portion 22. Therefore, the first outer core portion 21, the inner coil 12, and the second outer coil 13 extend in the X-axis direction and are disposed side by side in the Y-axis direction.

In the three-phase reactor 1, when currents are controlled to flow through any two or more of the coils 11, 12, and 13, directions of magnetic fluxes (hereinafter referred to as "magnetic flux direction") generated in each coil are controlled to be opposite to each other in any combination, so that a direct current magnetic flux generated in the core can be reduced. Accordingly, magnetic saturation in the core 20 can be prevented.

In the two-phase operation, by selecting the first outer coil 11 and the second outer coil 13, the direct current magnetic flux generated in the core becomes uniform by the currents flowing through each of the coils 11 and 13, and direct current magnetic fluxes generated in the core are canceled. In the one-phase operation, any one of the coils 11, 12, and 13 may be selected as the coil to be operated because an operation of canceling the magnetic flux does not occur.

In the three-phase operation, by the current flowing through each of the coils 11, 12, and 13, at least a part of the magnetic fluxes generated in the core is canceled out, so that the magnetic flux generated in the core of each of the coils 11, 12, and 13 can be reduced, but in order to cancel out a larger amount of the magnetic fluxes, it is necessary to make the magnetic fluxes generated in the core uniform.

Figure 4:
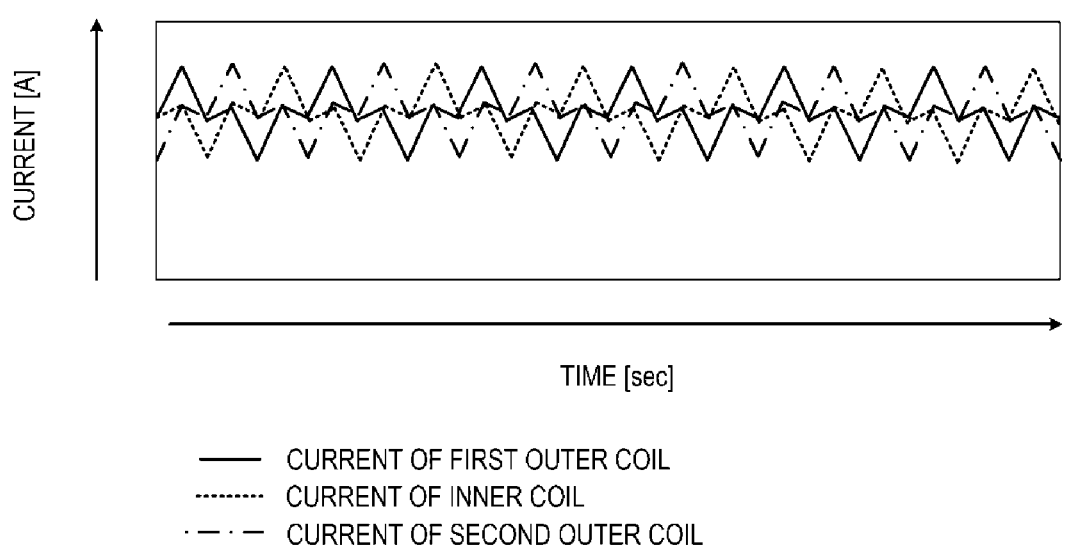
FIG. 4 is a graph showing, when values of currents of a first outer coil 11, a second outer coil 13, and an inner coil 12 are controlled to be equal to each other in a three-phase operation, the currents flowing through each coil.
Figure 5:
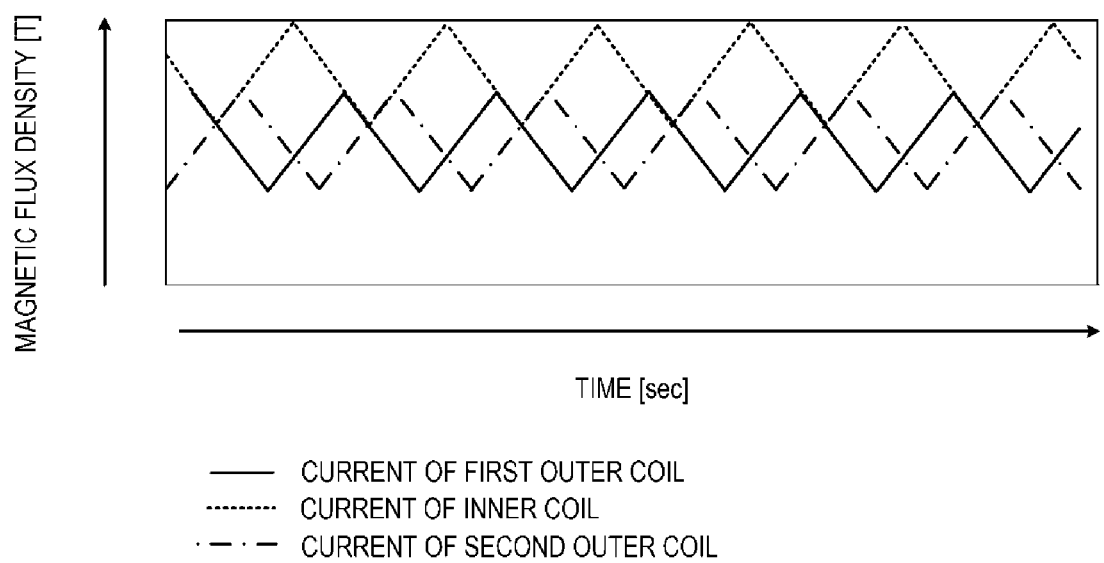
FIG. 5 is a graph showing magnetic flux densities of a first outer core portion 21, a second outer core portion 23, and an inner core portion 22 in control of FIG. 4.

FIG. 4 is a graph showing, when values of the currents of the first outer coil 11, the second outer coil 13, and the inner coil 12 are controlled to be equal to each other in the three-phase operation, the currents flowing through each coil. FIG. 5 is a graph showing magnetic flux densities of the first outer core portion 21, the second outer core portion 23, and the inner core portion 22 in control of FIG. 4.

As can be seen from FIGS. 4 and 5, in the three-phase operation of the three-phase reactor 1, even if the values of the currents of the first outer coil 11, the second outer coil 13, and the inner coil 12 are controlled to be equal to each other, the magnetic flux densities of the first outer core portion 21, the second outer core portion 23, and the inner core portion 22 are not uniform, and in this example, the magnetic flux density of the inner core portion 22 is larger than the magnetic flux densities of the first outer core portion 21 and the second outer core portion 23.

Therefore, the control device CTR controls a value $I_2$ of the current flowing through the inner coil 12 so as to approach a value $I_0$ of the current flowing through the first outer coil 11 and the second outer coil 13. Specifically, the control device CTR adjusts a duty ratio in an ON/OFF switching operation of the switch portions SW3 and SW4 of the second voltage conversion unit 15 in the control of the value $I_2$ of the current flowing through the inner coil 12.

Figure 6:
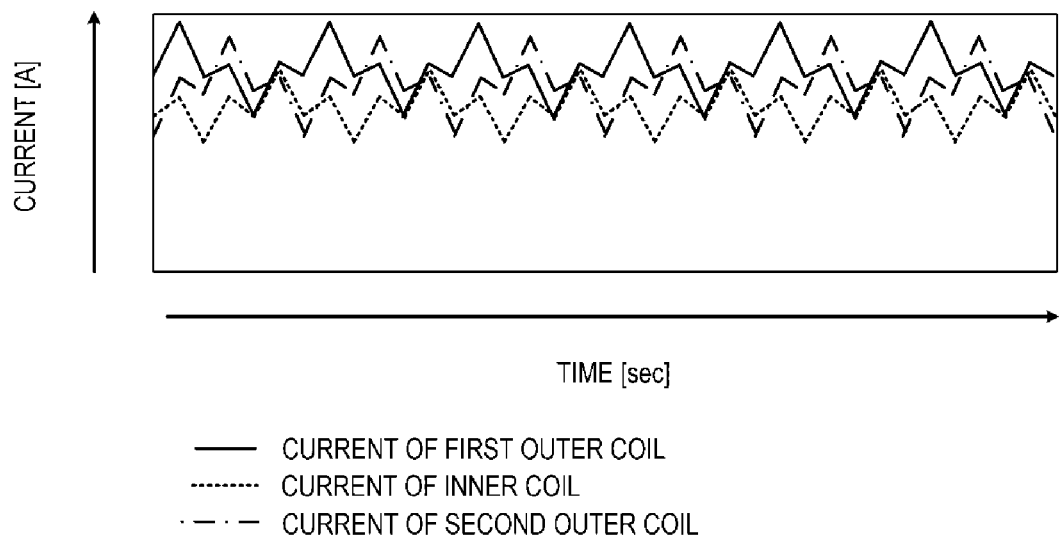
FIG. 6 is a graph showing, when the value of the current of the inner coil 12 is controlled to be smaller than the values of the currents of the first outer coil 11 and the second outer coil 13 in the three-phase operation, the currents flowing through each coil.
Figure 7:
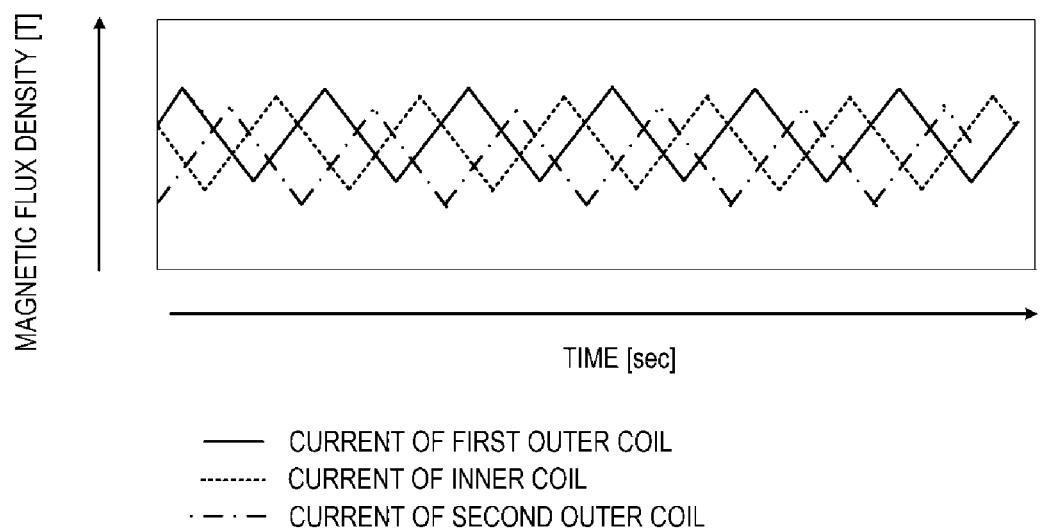
FIG. 7 is a graph showing the magnetic flux densities of the first outer core portion 21, the second outer core portion 23, and the inner core portion 22 in control of FIG. 6.

FIG. 6 is a graph showing, when the value of the current of the inner coil 12 is controlled to be smaller than the values of the currents of the first outer coil 11 and the second outer coil 13 in the three-phase operation, the currents flowing through each coil. FIG. 7 is a graph showing the magnetic flux densities of the first outer core portion 21, the second outer core portion 23, and the inner core portion 22 in control of FIG. 6.

As can be seen from FIGS. 6 and 7, in the three-phase operation of the three-phase reactor 1, by controlling the value of the current of the inner coil 12 to be smaller than the values of the currents of the first outer coil 11 and the second outer coil 13, the magnetic flux densities of the first outer core portion 21, the second outer core portion 23, and the inner core portion 22 become substantially uniform. In this example, a case where magnetic resistance of the inner core portion 22 is lower than magnetic resistance of the first outer coil 11 and the second outer coil 13 is described as an example. However, when the magnetic resistance of the inner core portion 22 is higher than the magnetic resistance of the first outer coil 11 and the second outer coil 13, the magnetic flux densities of the first outer core portion 21, the second outer core portion 23, and the inner core portion 22 can be made substantially uniform by controlling the value of the current of the inner coil 12 to be larger than the values of the currents of the first outer coil 11 and the second outer coil 13.

Although the embodiment is described above with reference to the drawings, it is needless to say that the present invention is not limited to such examples. It is apparent to those skilled in the art that various changes and modifications can be conceived within the scope of the claims, and it is also understood that such changes and modifications belong to the technical scope of the present invention. Components in the embodiment described above may be combined freely within a range not departing from the spirit of the invention.

At least following matters are described in the present specification. Corresponding constituent elements or the like in the above-described embodiment are shown in parentheses. However, the present invention is not limited thereto.

(1) A control device (control device CTR) for a power conversion device (DC-DC converter 10) using a three-phase magnetic coupling reactor (three-phase magnetic coupling reactor 1), the control device for a power conversion device including:

a first outer coil (first outer coil 11);

a second outer coil (second outer coil 13):

an inner coil (inner coil 12) disposed between the first outer coil and the second outer coil; and a core (core 20) including a first outer core portion (first outer core portion 21) around which the first outer coil is wound, a second outer core portion (second outer core portion 23) around which the second outer coil is wound, and an inner core portion (inner core portion 22) around which the inner coil is wound, in which the first outer core portion, the second outer core portion, and the inner core portion extend in a first direction (X-axis direction) and are disposed side by side in a second direction (Y-axis direction) orthogonal to the first direction, the first outer core portion, the second outer core portion, and the inner core portion are connected by a first connecting portion (first connecting portion 24) that extends in a second direction (Y-axis direction) on one end side in the first direction, the first outer core portion, the second outer core portion, and the inner core portion are connected by a second connecting portion (second connecting portion 25) that extends in the second direction on the other end side in the first direction, and directions of magnetic fluxes generated in the first outer coil, the second outer coil, and the inner coil are opposite to each other in any combination, in which the control device is configured to in a three-phase operation in which currents are caused to flow through all of the first outer coil, the second outer coil, and the inner coil to be operated, control a value of the current flowing through the inner coil so as to approach values of the currents flowing through the first outer coil and the second outer coil.

In the three-phase magnetic coupling reactor having the planar structure, since magnetic resistance of magnetic circuits when the currents flow through the first outer coil and the second outer coil are different from magnetic resistance of a magnetic circuit when the current flows through the inner coil in the structure, the values of the currents are different among the currents flowing through the first outer coil and the second outer coil and the current flowing through the inner coil during the three-phase operation. When the values of the currents are different, the direct current magnetic fluxes generated in the core cannot be sufficiently canceled, and a size of the core has to be increased in order to prevent the magnetic fluxes from being saturated. According to (1), in the three-phase operation of the power conversion device, by controlling the values of the currents flowing through the inner coil so as to approach the values of the currents flowing through the first outer coil and the second outer coil, the magnetic fluxes generated in the core can cancel each other out, and the size of the core can be reduced.

(2) In the control device for a power conversion device according to (1), the control device is configured to, in the three-phase operation, when magnetic resistance of the inner core portion is larger than magnetic resistance of the first outer core portion and the second outer core portion, control the value of the current flowing through the inner coil to be larger than the values of the currents flowing through the first outer coil and the second outer coil, and when the magnetic resistance of the inner core portion is smaller than the magnetic resistance of the first outer core portion and the second outer core portion, control the value of the current flowing through the inner coil to be smaller than the values of the currents flowing through the first outer coil and the second outer coil.

According to (2), when the magnetic resistance of the inner core portion is large, the value of the current flowing through the inner coil is increased, and when the magnetic resistance of the inner core portion is small, the value of the current flowing through the inner coil is reduced, so that the magnetic fluxes generated in the core can be made uniform.

The invention claimed is:

1. A control device for a power conversion device using a three-phase magnetic coupling reactor, the control device comprising:
   a first outer coil;
   a second outer coil;
   an inner coil disposed between the first outer coil and the second outer coil; and
   a core including a first outer core portion around which the first outer coil is wound, a second outer core portion around which the second outer coil is wound, and an inner core portion around which the inner coil is wound, wherein:
   the first outer core portion, the second outer core portion, and the inner core portion extend in a first direction and are disposed side by side in a second direction orthogonal to the first direction;
   the first outer core portion, the second outer core portion, and the inner core portion are connected by a first connecting portion that extends in a second direction on one end side in the first direction;
   the first outer core portion, the second outer core portion, and the inner core portion are connected by a second connecting portion that extends in the second direction on another end side in the first direction;
   the first outer core portion, the second outer core portion and the inner core portion are configured so that magnetic fluxes generated at the first outer core portion, the second outer core portion and the inner core portion cancel each other in a three-phase operation in which all of the first outer core portion, the second outer core portion and the inner core portion are operated with currents in a same direction;
   in a three-phase operation, when magnetic resistance of the inner core portion is larger than magnetic resistance of the first outer core portion and the second outer core portion, the control device controls a value of a first current of the currents flowing through the inner coil to be larger than a value of a second current of the currents flowing through the first outer coil and a value of a third current of the currents flowing through the second outer coil; and
   in the three-phase operation, when the magnetic resistance of the inner core portion is smaller than the magnetic resistance of the first outer core portion and the second outer core portion, the control device controls the value of the first current to be smaller than the values of the second current and the third current.

* * * * *